United States Patent [19]
Allen

[11] Patent Number: 5,361,959
[45] Date of Patent: Nov. 8, 1994

[54] STRAP TENSIONING SYSTEM

[76] Inventor: Alexander R. Allen, 29 Devens St., Concord, Mass. 01742

[21] Appl. No.: 82,835

[22] Filed: Jun. 28, 1993

Related U.S. Application Data

[62] Division of Ser. No. 801,439, Dec. 2, 1991, abandoned.

[51] Int. Cl.⁵ ............................................. B60R 9/00
[52] U.S. Cl. ................... 224/314; 224/329; 24/301
[58] Field of Search ............... 224/273, 314, 318, 329, 224/42.45 R, 309; 24/300, 301, 298, 265 H; 248/499; 292/288; 267/69, 73, 74; 410/23; 211/17, 18

[56] References Cited

U.S. PATENT DOCUMENTS

| | | | |
|---|---|---|---|
| 766,092 | 7/1904 | Wright | 267/74 |
| 875,051 | 12/1907 | Cummings | 267/73 |
| 3,011,818 | 12/1961 | Matthiessen | 248/499 X |
| 3,869,114 | 3/1975 | Schneider | 267/69 |
| 3,927,811 | 12/1975 | Nussbaum | 224/314 X |
| 4,694,541 | 9/1987 | Skyba | 24/301 |
| 4,830,250 | 5/1989 | Newbold et al. | 224/314 |

FOREIGN PATENT DOCUMENTS 97833  1/1940  Sweden ................... 24/73

Primary Examiner—Glenn T. Barrett
Attorney, Agent, or Firm—Herbert L. Bello

[57] ABSTRACT

A method and apparatus for carrying one or more bicycles on a motor vehicle and a strap for securing the carrier to the motor vehicle. The strap includes a stretchable and contractible resilient web that is connected intermediate the ends of the strap. A loop is formed in the strap when the strap is not tightened. The web is stretched by tightening and serves to maintain tension in the strap. When tightened, adjacent surfaces of that portion of the strap forming the loop and the web are in close juxtaposition. Separation between adjacent surfaces of the resilient web and the portion of the strap that forms the loop, provides a visual indication of the degree of strap tension.

9 Claims, 2 Drawing Sheets

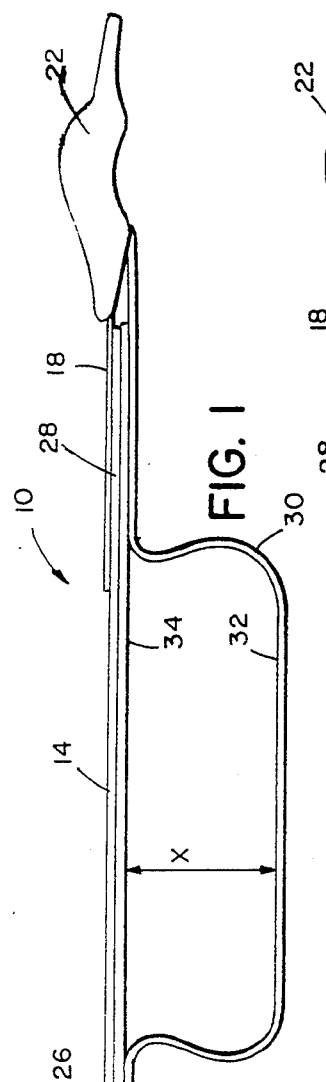
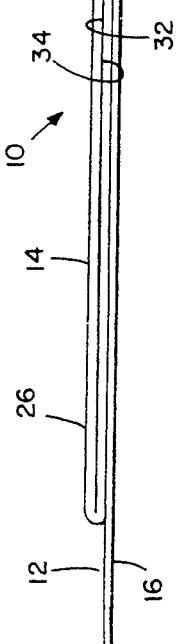
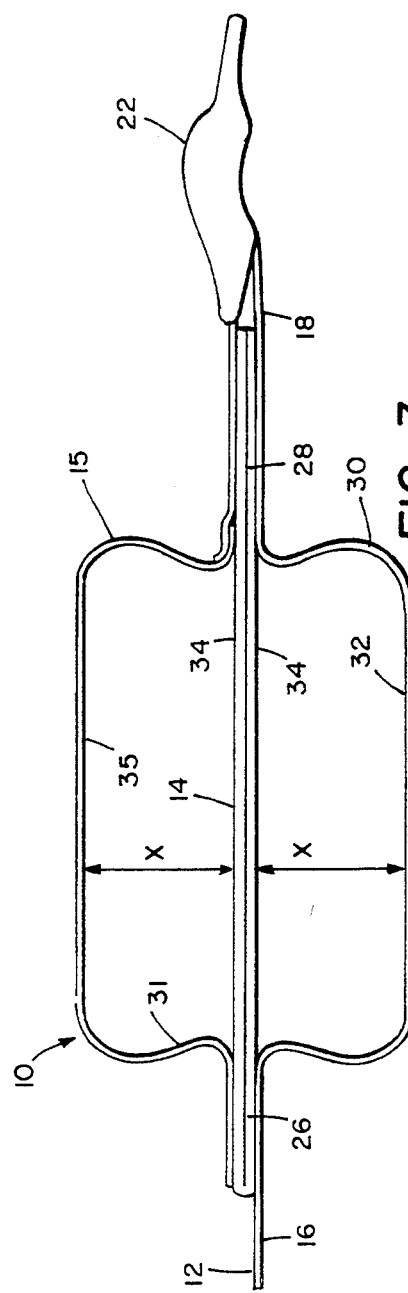
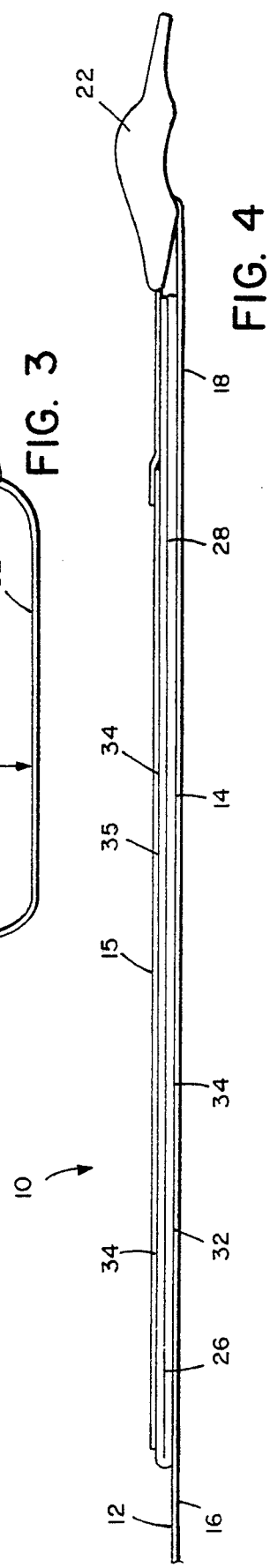

STRAP TENSIONING SYSTEM

This is a division of application Ser. No. 07/801,439, filed Dec. 2, 1991.

BACKGROUND OF THE INVENTION

1. Field of the Invention

The present invention relates to a system for carrying one or more bicycles on a motor vehicle. More particularly, the invention relates to an apparatus and method for securing a bicycle carrier to a motor vehicle.

2. Description of the Prior Art

A variety of bicycle carriers that are configured to be mounted on motor vehicles are available in the prior art. Examples of carriers which are mountable on automobiles are shown in U.S. Pat. Nos. 4,518,108 and 4,709,840.

Generally, bicycle carriers are secured to motor vehicles using a pair of straps, one at each end of the carrier. Typically, one end of each strap is connected to the carrier and the other end is affixed to the motor vehicle using, for example, a hook connected to the strap. Although the use of straps for this purpose is highly effective, it has been observed that the bottom hooks can become disengaged when the top straps are suddenly stretched and relaxed due to jarring of the motor vehicle. Consequently, the carrier becomes disengaged from the motor vehicle and may fall off.

The danger of a carrier falling off a motor vehicle is enhanced when individuals fail to adequately tighten the connecting straps after loading items, for example, bicycles, on the carrier. The need to retighten the straps after loading is not readily apparent because the slackness which occurs as a result of such loading is not always visually discernable. If the strap is loose from the outset, it becomes more likely that the slackness caused by jarring will result in damage to either the bicycle or the motor vehicle or both.

A need has arisen for a system capable of maintaining a tension in a strap while indicating the occurrence of any slackness.

SUMMARY OF THE INVENTION

It is an object of the present invention to provide a mounting strap which does not suffer from the foregoing disadvantages and limitations.

It is another object of the present invention to provide an apparatus and method for maintaining straps used to connect a bicycle carrier to a motor vehicle under tension.

It is a further object of the present invention to provide an apparatus which provides a visual indication of the amount of tension in a strap.

The system of the present invention is characterized by a strap means connected to a carrier. The carrier is configured to be mountable on a motor vehicle and carry at least one bicycle. The carrier can include a frame having carrying and supporting members pivotally connected thereto.

The strap means includes a strap and a stretchable tension means. The strap has first and second ends and, preferably, is composed of a substantially non-elastic, corded web. The tension means is a stretchable resilient web or spring having first and second ends. The web or spring is selected such that it will provide the desired tensioning force during operation.

In one embodiment of the invention, the resilient web is connected intermediate the ends of the strap. The length of the strap between the ends of the resilient web is greater than the overall length of the resilient web when in its unstretched relaxed state. As a result of this configuration, a loop having a linear length of between about three and eight inches, preferably between about four and six inches, is formed in the strap when the web is relaxed. In operation, the distance between adjacent surfaces of the resilient web and the loop acts as an indicator of the tension in the strap means. For example, the adjacent surfaces are separated when the strap means is relaxed and juxtaposed in substantially surface-to-surface contact when the strap means is under full tension.

In another embodiment of the invention, the resilient web is positioned at the end of the strap. The ends of the web are connected to the strap such that an elongate loop is formed in the web when it is relaxed. In operation, the distance between facing surfaces of the resilient web acts as an indicator of the tension in the strap means. For example, the surfaces are separated when the strap means is relaxed and juxtaposed in substantially surface-to-surface contact when the strap means is under full tension.

The resilient web can be positioned on the strap to adapt to the configuration of the carrier and/or proposed usage of the strap means, i.e., for connection to a motor vehicle bumper or trunk lid. The resilient web can be positioned in close proximity to a buckle or at an end of the strap means as desired.

The invention also contemplates a method of mounting one or more bicycles on a motor vehicle. The method utilizes the system described above. Once the carrier of the system has been placed on the motor vehicle, the strap is connected to the motor vehicle and tightened. As the resilient web is stretched adjacent surfaces of the loop and resilient web, or facing surfaces of the web, move into substantially surface-to-surface contact. Once these surfaces are in contact, the strap means is secured in position.

Having positioned and secured the system of the invention to a motor vehicle, bicycles can be mounted on the carrier. Typically, such loading will cause loosening of the strap means which is indicated by an increase in the amount of separation between either adjacent surfaces of the loop and the resilient web or facing surfaces of the web. Thus, this separation provides an indication of slackness in the strap means. To remove the slackness, the strap is merely tightened.

Other general and specific objects of the invention will in part be obvious and will in part appear hereinafter.

The invention accordingly comprises the steps and apparatus embodying features of construction, combinations of elements and arrangements of parts adapted to effect such steps, as exemplified in the following detailed disclosure, and the scope of the invention is indicated in the claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 1 is a side view of a first embodiment of the invention with the resilient web in its unstretched condition;

FIG. 2 is a side view of the embodiment of the invention depicted in FIG. 1 with the web in its stretched condition and the strap means in tension;

FIG. 3 is a side view of a second embodiment of the invention with the resilient web in its unstretched condition;

FIG. 4 is a side view of the embodiment of the invention depicted in FIG. 3 with the web in its stretched condition and the strap means in tension;

DETAILED DESCRIPTION OF THE PREFERRED EMBODIMENTS

Figure 5:
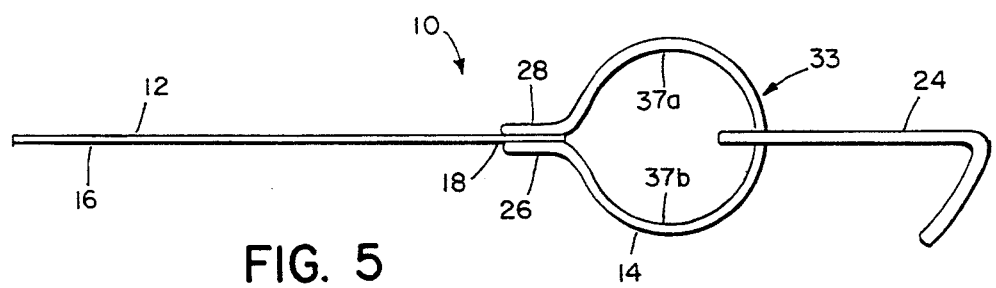
FIG. 5 is a side view of a third embodiment of the invention with the resilient web in its unstretched condition.

Referring to FIGS. 1 through 7, wherein like reference numerals refer to like parts, there is illustrated a strap means 10 including a strap 12 and a stretchable tension device 14.

Figure 6:
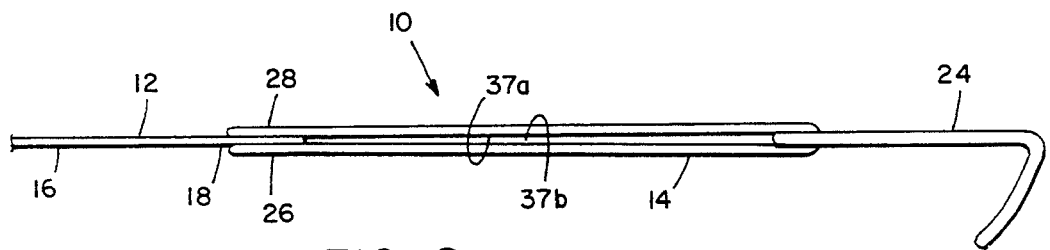
FIG. 6 is a side view of the embodiment of the invention depicted in FIG. 5 with the web in its stretched condition and the strap means in tension.

As shown in FIG. 1, the strap means 10 includes an elongate strap 12 having a shorter resilient web 14 connected thereto. The strap 12 is composed of a strong, flexible, substantially non-stretchable material, such as a polyamide material. The strap 12 has a first end 16 and a second end 18. Typically, one of the ends 16 or 18 is connected to the carrier 20 (FIG. 7) as described in detail below. The remaining end of the strap 12 is modified to permit connection to a motor vehicle bumper or trunk lid. For example, as shown in FIGS. 1 through 4, the resilient web 14 can be adjacent to a buckle 22 that is connected at one end of the strap 12. In an alternative embodiment, a hood 24 of the type shown in FIG. 5 is used in place of buckle 22. Alternatively, as shown in FIGS. 5 and 6 the resilient web 14 can also be used to provide a method for connecting a hook 24 to an end of the strap 12. In the illustrated embodiments of the invention, the strap 12 is substantially flat and has a rectangular cross-section. Preferably, the strap 12 is between about three and four feet long and between about three-quarters and one and one-half inches wide.

The resilient web 14 preferably is composed of a corded, stretchable and contractible resilient web material having an elongate shape and rectangular cross-section. It can be manufactured from natural or synthetic elastomeric materials familiar to those skilled-in-the-art. Several plies of the material forming the resilient web 14 can be used to increase the web's overall potential tensioning force. Element 14 has a first end 26 and a second end 28 which are connected, for example, stitched, onto the strap 12. In the embodiments of the invention shown in FIGS. 1 through 4, the resilient web 14 is connected to the strap 12 at a position intermediate the ends 16 and 18 of the strap 12. More particularly, the resilient web 14 is connected to the strap 12 such that the length of the strap 12 between the ends of the resilient web 14 is greater than the overall length of the resilient web 14 itself when in its relaxed state. Accordingly, a loop 30 is produced in the strap 12. Further, as shown in FIGS. 3 and 4 a piece of material 15 composed of the same or similar material forming the strap 12 can be attached to the side of the web 14 opposite strap 12 so as to form a second loop 31. In all these embodiments of the invention, when the resilient web 14 is relaxed it is about two inches long and the linear length of the loops 30 and 31 is between about three and eight inches, preferably between about four and six inches. In an alternative embodiment of the invention, shown in FIGS. 5 and 6, the first end 26 and second end 28 of web 14 are each connected to the same end of the strap 12. This configuration produces a loop in 33 in the web 14.

FIGS. 1 through 6 demonstrate how the loops 30, 31, and 33 and resilient web 14 cooperate to maintain the strap means 12 under tension as well as provide a visual indicator of the degree of slackness in the strap 12.

FIG. 1 shows the strap means 10 in its relaxed condition. When in this condition, surface 32 of the loop 30 and surface 34 of resilient web 14 are separated by a distance "X". As the strap means 10 is pulled tight and tension is placed in strap 12, web 14 stretches and the surfaces 32 and 34 move into juxtaposition relative to each other until they are in substantially surface-to-surface contact. Stretching of the web 14 is limited by the length of the loop 30. The strap means 10 is shown in its tensioned condition in FIG. 2. It will be apparent that the degree of separation between the surfaces 32 and 34 provides a visual indication of the relative tension or slackness in the strap 12. As the tension in the strap 12 approaches the desired level, the separation between these surfaces decreases. If the strap 12 is suddenly stretched and relaxed as may occur due to a jarring of the motor vehicle, the resilient web 14 contracts to absorb any slackness in the strap and maintains tension on the ends of the strap 12. The two loop embodiment of the invention shown in FIG. 3 functions in the same manner as the one loop embodiment of FIG. 1.

FIG. 3 shows the strap means 10 in its relaxed condition. When in this condition, surfaces 32 and 35 of the loops 30 and 31 and surface 34 of resilient web 14 are separated by a distance "X". As the strap means 10 is pulled tight, web 14 stretches until limited by the length of loops 30 and 31, At this point the strap 12 is in tension and the surfaces 32, 34 and 35 are juxtaposed relative to each other in substantially surface-to-surface contact. The strap means 10 is shown in its tensioned condition in FIG. 4. It will be apparent that the degree of separation between the surfaces 32 and 34, and 35 and 34, provides a visual indication of the relative tension or slackness in the strap 12. As the tension in the strap 12 approaches the desired level, the separation between these surfaces decreases. If the strap 12 is suddenly stretched and relaxed as may occur due to a jarring of the motor vehicle, the resilient web 14 contracts to absorb any slackness in the strap and maintains tension on the ends of the strap 12.

The embodiment of the invention shown in FIGS. 5 and 6 operates in a manner identical to that of FIGS. 1 through 4, however, it is the separation of facing surfaces 37a and 37b of the web 14 which provides a visual indicator of the relative tension or slackness in the strap 12. In this case, the web 14 has a limited degree of stretchability which, when reached, prevents further stretching of the web 14. Preferably the web 14 stretches at least two inches.

Figure 7:
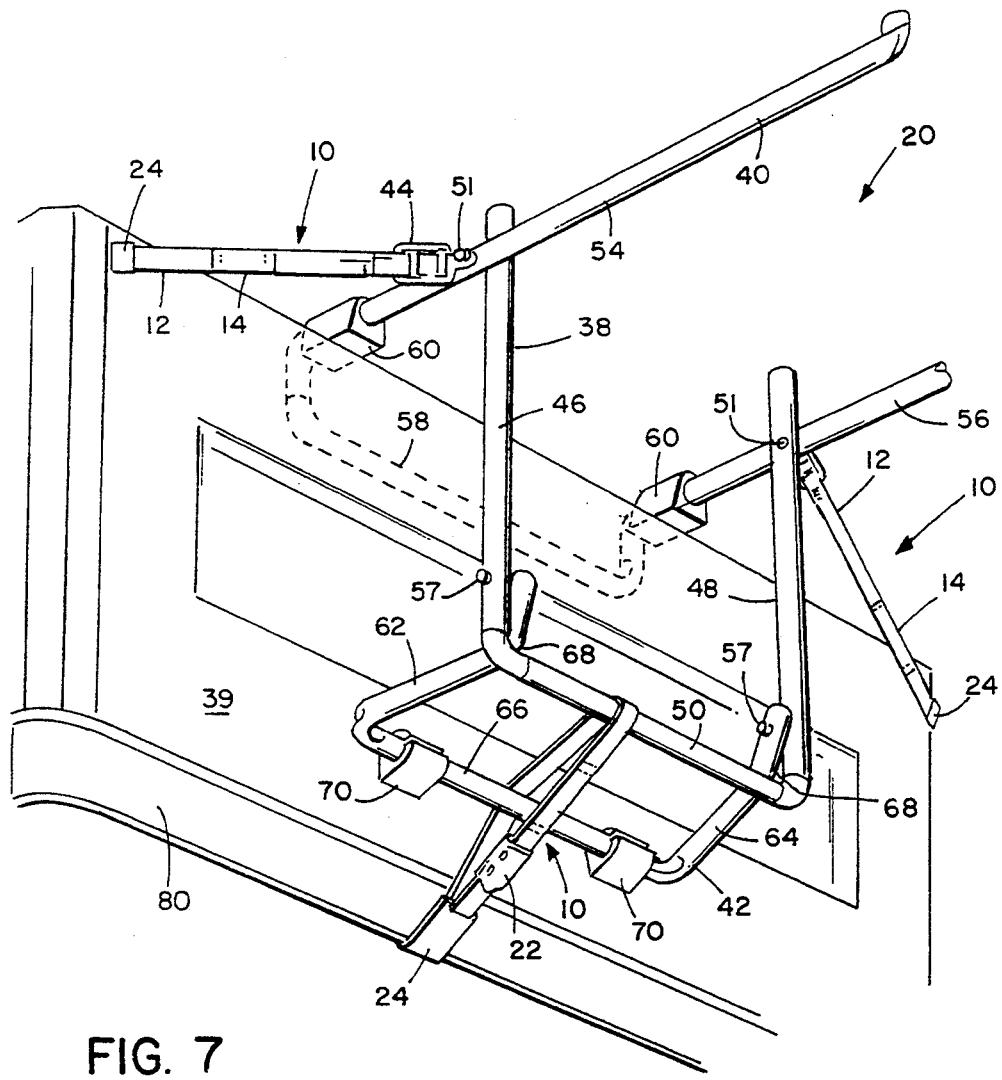
FIG. 7 is a perspective view of the system of the invention mounted on a motor vehicle.

As previously discussed, the strap means 10 can be used in conjunction with a carrier 20 of the type shown in FIG. 7 which is mounted to a tailgate 39. In general, the carrier 20 includes a frame 38 having a carrying member 40 and supporting member 42 rotatably mounted thereto. The carrying member 40 and supporting member 42 are constrained for limited rotational movement relative to the frame 38 between extended carrying positions and collapsed stored positions. In the illustrated embodiment, the strap means 10 is connected to the carrier 20 using clamps 44. In an alternative embodiment, other fasteners, such as pins and bolts can also be used. As shown in FIG. 7, the strap means 10 can also be used as a belt to secure the carrier 20 to the motor vehicle bumper.

The frame 38 is a substantially U-shaped member which is composed of a strong durable material, such as aluminum, steel, or polymeric composites. The frame 38 includes a pair of legs 46 and 48 that are integral with a cross member 50. The legs 46 and 48, and cross member 50, are of sufficient size to provide mechanical support for the carrying member 40 and supporting member 42. Each of the legs 46 and 48 are rotatably connected to the carrying member 40 via a pin, bolt or other fastener 51 and supporting member 42 is pivotally mounted to the carrying memeber 40 by means of a pin, bolt or other fastener 57.

The carrying member 40 can be rotated to the carrying position shown in FIG. 7, wherein it is oriented substantially perpendicular to the frame 38, from a stored position (not shown) wherein it and the frame 38 are substantially in side-by-side relationship. Carrying member 40 is a substantially U-shaped member formed of materials similar to that of the frame 38, preferably steel or aluminum tubing. Structurally, the carrying member 40 includes a pair of arms 54 and 56 that are integral with a front foot bar 58 (shown in phantom). A first pair of feet 60 manufactured from, for example, rubber, are typically mounted on the front foot bar 58. When the carrier 20 is mounted on a vehicle the feet 60 help prevent scratching of the vehicle surface as a result of contact between the carrier 20 and the vehicle.

A strap means 10 is attached to each of the arms 54 and 56 of the carrying member 40. More particularly, the fasteners 51 which connect the frame 38 to the carrying member 40 are used to connect the clamps 44 to the member 40. Each strap means 10 is then threaded through a clamp 44 in order to connect it to the carrier 20. Alternatively, the fasteners 51 can be used to connect the strap means 10 to the carrying member 40.

The supporting member 42 can be rotated to a carrying position from a stored position and also is a substantially U-shaped member formed of aluminum tubing. Supporting member 42 comprises a pair of legs 62 and 64 that are integral with a rear foot bar 66. The legs 62 and 64 are bent so as to define stop elements 68 which restrict and limit the rotational movement of the supporting member 42 relative to the frame 38. In particular, the stop elements 68 maintain the supporting member 42 substantially perpendicular to the frame 38 when the carrier 20 is in use. A second pair of feet 70 are typically mounted on the rear foot bar 66. Strap means 10 is used to hold the carrier 20 against tailgate 39 as shown in FIG. 7. Typically strap means 10 encircles both the frame 38 and the rear foot bar 66 of the supporting member 42, the hook 24 is in gripping engagement with a bumper 80.

The invention also contemplates a method of mounting one or more bicycles on a motor vehicle. The method utilizes the system, i.e., the strap means 10 and carrier 20, described above. Once the carrier 20 is positioned on the motor vehicle at least one strap means 10 is connected to the motor vehicle. Referring to FIG. 7, typically those straps connected to the carrying member 40 are used to connect the carrier 20 to a trunk panel or tail gate 39. A third strap means 10 encircles portions of the frame 38 and supporting member 42 and is then connected to the bumper 80 via hook 24. Next, each of the strap means 10 is, in turn, tightened. Each strap means 10 is secured in position when the strap 12 is tight, the appropriate surfaces being juxtaposed in substantially surface-to-surface contact, as shown in FIGS. 2, 4, and 6.

Having positioned and secured the carrier 20 using the strap means 10 of the invention, bicycles, for example, are mounted on the carrier 20. Typically, such loading will cause some slackening in the bottom strap 12 that fastens the carrier 20 to the bumper 80. Such slackening is indicated by an increase in the amount of separation between surfaces of the strap 12 and web 14, or surfaces of the web 14 alone, as appropriate. To remove such slackness, strap 12 is tightened.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A system for carrying one or more bicycles on a motor vehicle, said system comprising:
   (a) a carrier means for carrying at least one bicycle, said carrier means configured to be mounted on a motor vehicle; and
   (b) a strap means for securing said carrier means to the motor vehicle, said strap means including a strap and a stretchable and contractible resilient web, said strap having a first end and a second end, said resilient web having contracted, relaxed and expanded, stretched states, said web having a first length when in said relaxed state and a second length when in said stretched state, said second length being greater than said first length, said resilient web in tension when said carrier means is secured to the motor vehicle by said strap means, said web maintaining tension in said strap means when the tension in said strap is reduced due to jarring of said carrier means, said web having a first end and a second end each connected to one end of said strap such that an open loop is formed in said resilient web when in said relaxed state, the separation between facing surfaces of said loop in said resilient web being an indicator of the tension in said strap means, said facing surfaces are separated when said strap is slack and in substantially surface-to-surface contact when said strap is under tension.

2. The system of claim 1 wherein said strap is composed of a substantially non-elastic, corded web.

3. The system of claim 1 wherein said resilient web has a linear length of between about three and about eight inches when in its relaxed state.

4. The system in claim 1 wherein said second length is at least one and one-half times greater than said first length when said web is fully stretched.

5. An apparatus for securing a carrier for carrying one or more bicycles on a motor vehicle, said apparatus comprising a strap means for securing the carrier to the motor vehicle, said strap means including a strap and a tension means connected to said strap, said tension means having contracted, relaxed and expanded, stretched states, said tension means having and first end and a second end, both said first end and said second end being affixed to one end of said strap, said tension means having a first length when in said relaxed state and a second length when in said stretched state, said second length being greater than said first length, said tension means providing a continuous range of tension on said strap when the carrier is secured to the vehicle by said strap means, said tension means maintaining tension in said strap means when tension on said strap is reduced due to jarring of the carrier, said tension means being in the form of an open loop, opposite surfaces of said loop being in spaced relationship when said tension means is in said contracted state, said opposite surfaces being spaced apart a first distance when said tension means is in said relaxed state, said opposite surfaces being spaced apart a second distance when said tension means is in said stretched state, said first distance being greater than said second distance, said first distance and said second distance respectively providing a visual indication of slackness and tension in said strap means.

6. The system of claim 5 wherein said strap is composed of a flexible substantially non-stretchable material.

7. The system of claim 5 wherein said tension means is a resilient web.

8. The apparatus of claim 5 wherein said second length is at least one and one-half times greater than said first length when said tension means is fully stretched.

9. A system for carrying one or more bicycles on a motor vehicle, said system comprising:
   (a) a carrier means for carrying at least one bicycle, said carrier means configured to be mounted on a motor vehicle; and
   (b) a strap means for securing said carrier to the motor vehicle, said strap means including a strap and a tension means connected to said strap, said tension means having a first end and a second end, both said first end and said second end being attached to one end of said strap, said tension means having relaxed and stretched states, said tension means having a first length when in said relaxed state and a second length when in said stretched state, said second length being at least one and one-half times greater than said first length when said tension means is fully stretched, said tension means providing a continuous range of tension on said strap when said strap secures the carrier to the motor vehicle, said tension means being in the form of a loop, opposite surfaces of said loop being in spaced relationship, said opposite surfaces being spaced apart a first distance when said tension means is in said relaxed state, said opposite surfaces being spaced apart a second distance when said tension means is in said stretched state, said first distance being greater than said second distance, said first distance and said second distance respectively providing a visual indication of the slackness and tension in said strap means.

* * * * *